Figure 1:
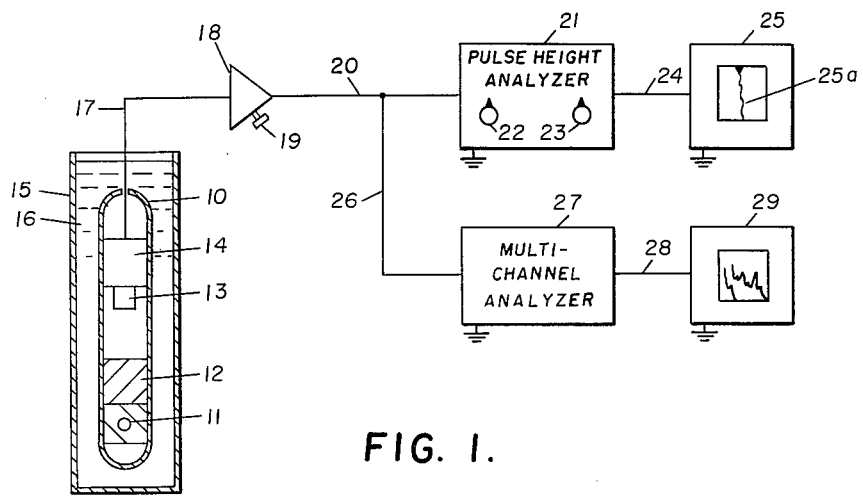

Oct. 19, 1965   R. L. CALDWELL   3,213,279
CALIBRATION OF RADIOACTIVE WELL LOGGING SYSTEM
Filed June 7, 1961

United States Patent Office 3,213,279
Patented Oct. 19, 1965

3,213,279
CALIBRATION OF RADIOACTIVE WELL
LOGGING SYSTEM
Richard L. Caldwell, Dallas, Tex., assignor to Socony
Mobil Oil Company, Inc., a corporation of New York
Filed June 7, 1961, Ser. No. 115,502
2 Claims. (Cl. 250—83)

This invention relates to radioactive well logging and more particularly to an improved method of and system for calibrating a radioactive well logging system for response to radiation within a predetermined energy band.

In the art of radioactive well logging, it is well known that the intensity or the count rate of secondary radiation within a predetermined energy band may be logged in order to detect the presence of certain elements within the formations traversed by a borehole. An energy discriminator, set to admit electrical pulses proportional in magnitude to the energy of the secondary radiation within the energy band of interest, may be used with the borehole instrumentation in order to log the count rate of the secondary radiation within such energy band.

To obtain an accurate log of the count rate of the secondary radiation within the desired energy band, the radioactive logging system must be calibrated in some manner. In the past, energy discriminators of radioactive well logging systems have been calibrated for response to the desired energy band with the aid of primary radiation from a known source of known energy. The secondary radiation detector used in the radioactive logging system is interconnected with a multichannel analyzer and an oscilloscope, and the detector is then irradiated with the primary radiation in order to obtain a visual display of the primary radiation energy spectrum on the screen of the oscilloscope. The energy discriminator, which is also interconnected with the detector, is then adjusted, in accordance with the positions of spectral peaks of the primary radiation at known energy levels, for response to the desired energy band. Alhtough in practice the oscilloscope is a convenient means of observing the spectrum, other recording means could be employed such as digital recording.

The primary radiation from a source which has been used for calibration purposes in the past has in general a low energy level and is unsatisfactory if the energy band of interest, for example, the energy band of the prominent neutron-capture gamma rays of chlorine, is at an energy level substantially greater than that of the primary radiation.

To calibrate an energy discriminator in accordance with the prior art for response to an energy band in a region beyond the level of the primary radiation used for calibration purposes, an extrapolation process must be used. In other words, the position of the high energy band of interest on the screen of the oscilloscope in the region beyond the energy level of the primary radiation must be estimated on the basis of the positions of the known spectral peaks of the low energy primary radiation and the energy discriminator then calibrated in accordance with such estimation.

Such an extrapolation process produces unsatisfactory results, since the logging instrumentation, which are designed to be linear, in reality may not be linear and/or may become nonlinear over a period of time. The nonlinearity of the logging instrumentation may cause the position of the desired energy band in a region beyond the energy level of the primary radiation to shift in a nonpredictable manner. The low energy primary radiation which has been used for calibration purposes cannot reveal whether such a shift has taken place since its energy range does not extend out into the region of interest and an estimation of the position of the energy band on the screen of the oscilloscope in the unknown region is very likely to be erroneous.

To calibrate accurately a radioactive well logging system, including an energy discriminator, for response to secondary radiation within a desired energy band, the radiation used for calibration should have a spectrum with an energy range which includes the energy band of interest. Furthermore, if the position or the energy level of the energy band of interest is based upon the positions or energy levels of the prominent spectral peaks exhibited by the secondary radiation of interest, the radiation used for calibration should also exhibit spectral peaks at the same, or nearly the same, positions or energy levels. Thus, if, due to the nonlinearity of the logging instrumentation, the prominent spetcral peaks of the secondary radiation of interest are shifted to new positions, the prominent spectral peaks of the radiation used in calibrating will also be shifted to the same or nearly the same positions. Under these circumstances, the prominent spectral peaks of the radiation used in calibrating can be used as reference points to determine accurately the position of the desired energy band of interest. If the exact position of the energy band of interest, as observed on the screen of the oscilloscope, or by other means, is known, the radioactive logging system, including the energy discriminator, can be accurately calibrated in accordance with such position for response to the energy band of interest.

In accordance with the present invention, a radioactive well logging system which includes an energy discriminator is calibrated for response to a predetermined energy band of secondary radiation energy indicative of an element to be encountered within mrtiosnhte fea le1yaehto ment to be encountered within the formations traversed by a borehole. A synthetic environment is irradiated with primary radiation to produce secondary radiation of known energy which includes the energy band of interest. The secondary radiaion emitted by the synthetic environment is then used in calibrating the radioactive well logging system, including the energy discriminator for response to the energy band of interest.

In accordance with another embodiment of the present invention, a system for carrying out the method is provided and includes a synthetic environment which upon the irradiation thereof by primary radiation is productive of a known secondary radiation energy spectrum having an energy range which includes the energy band of interest. Also included in the system is a means interconnected with the detector for visually displaying the spectral disrtibution of the secondary radiation energy emitted by the synthetic environment whereby the positions of spectral peaks at known energy levels may be used as reference points in the calibration of the radioactive well logging system including the energy discriminator.

In a preferred embodiment, the discriminator may be calibrated for response to an energy band in which the prominent neutron-capture gamma rays of chlorine occur. It has been found that the discriminator may be calibrated very accurately for response to such an energy band with the aid of the prominent neutron-capture gamma rays of iron. Not only do the prominent gamma rays of iron extend over an energy range which includes the prominent gamma rays of chlorine, but the spectral peaks formed by the prominent gamma rays of iron also occur at nearly the same energy levels at which the spectral peaks formed by the prominent gamma rays of chlorine occur. Hence, the spectral peaks resulting from the prominent gamma rays of iron provide ideal reference points for the calibration of an energy discriminator for response to the prominent gamma rays of chlorine.

Accordingly, an object of this invention is to provide an improved method and system for calibrating a radioactive logging system including an energy discriminator for response to a predetermined energy band of secondary radiation.

Figure 2:
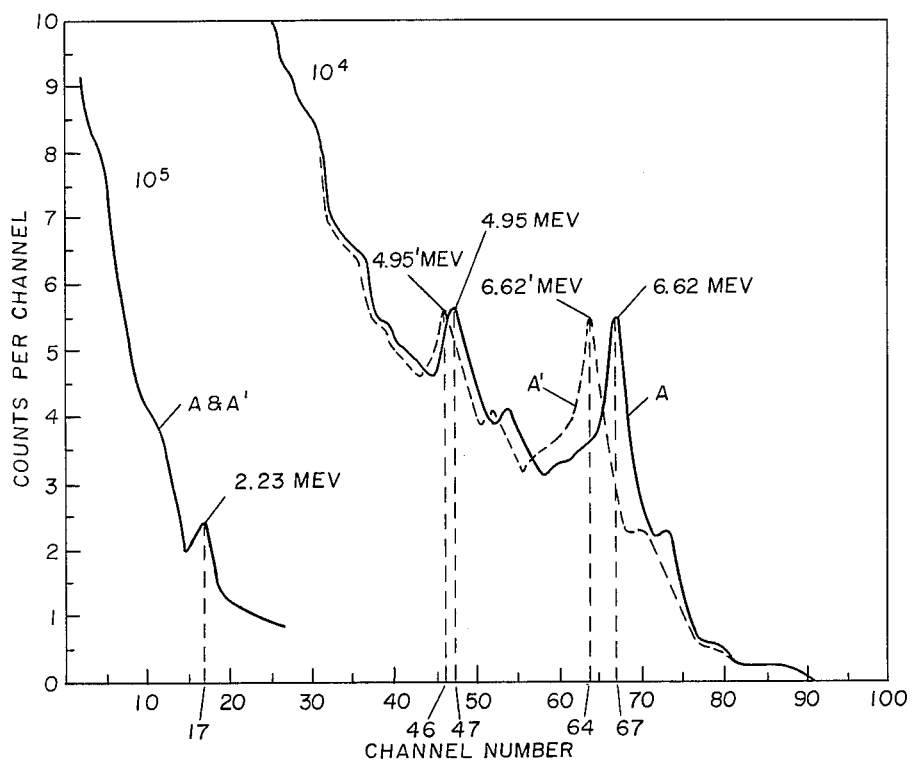

For further objects and advantages of the invention and for a more complete understanding thereof, reference may now be had to the following detailed description taken in conjunction with the accompanying drawings:

FIG. 1 diagrammatically illustrates a borehole instrument of a radioactive well logging system positioned within a synthetic environment for the purpose of calibrating the system including an energy discriminator thereof;

FIG. 2 illustrates a neutron-capture gamma ray spectrum of iron useful in the understanding of the present invention.

Referring now to FIG. 1 of the drawings, a logging instrument 10 having a primary radiation source 11 and a secondary radiation detector 13 is shown positioned within a synthetic environment 15. An energy discriminator or a pulse height analyzer 21 of the radioactive well logging system which is to be calibrated for response to secondary radiation within a desired energy band is shown interconnected with the logging instrument 10. Also shown interconnected with the logging instrument 10 is a multichannel analyzer 27 and an oscilloscope 29.

Upon the irradiation of the synthetic environment 15 with radiation from the source 11, secondary radiation having an energy spectrum which includes the energy band of interest is produced and detected by the detector 13. A shield 12 is provided to shield the detector from direct radiation from the source. Photomultiplier tube 14 converts the energy of the secondary radiation striking the detector into electrical pulses of proportional magnitude. The electrical pulses are applied to an amplifier 18 by way of line 17 and then to the pulse height analyzer 21 by way of line 20. The pulse height analyzer 21 can be made responsive to only the secondary radiation within the desired energy band, as is well known in the art, by adjusting the pulse height analyzer to pass only the electrical pulses having a magnitude proportional to the energy of the secondary radiation striking the detector within the desired energy band. The electrical pulses are also applied to the multichannel analyzer 27 by way of line 26 and the output of the multichannel analyzer is applied to an oscilloscope 29 by way of line 28. By using the multichannel analyzer and the oscilloscope, a visual display of the energy spectrum of the secondary radiation emitted by the synthetic environment 15 can be obtained whereby the spectral peaks of the secondary radiation at known energy levels can be used as an aid in the calibration of the pulse height analyzer 21 of the logging system.

The pulse height analyzer 21 can be adjusted for response to neutron-capture gamma rays within the desired energy band by the adjustment of the low-bias control 22 and the high-bias control 23 whereby only the electrical pulses having a magnitude proportional to the energy of the neutron-capture gamma rays striking the detector within the desired energy band will be passed. The signal on output line 24 which is proportional in magnitude to the integrated count rate or to the total number of gamma rays impinging on the crystal 13 within the desired energy band is then applied to recorder 25 which is used when the formations traversed by a borehole are to be logged. The trace 25a recorded on a chart of the recorder 25 will exhibit variations which are proportional to the vibrations of the neutron-capture gamma ray count detected within the desired energy band.

The multichannel analyzer 27 used in the present invention has a plurality of channels, for example, 100 channels. The electrical pulses from line 26 are sorted by the multichannel analyzer and directed into particular channels depending upon the magnitude of the pulses. Within each channel the pulses are stored and counted. The output of the multichannel analyzer 27 is applied to the oscilloscope 29 by way of line 28. As can be seen in FIG. 2, the oscilloscope 29 thus displays a plot of intensity or gamma ray count versus energy in mev., since each channel corresponds to a particular value of energy in mev.

If a chlorine log is to be obtained with the logging system, the pulse height analyzer of the logging system should be calibrated for response to the prominent neutron-capture gamma rays of chlorine. A synthetic environment or calibrator 15 of iron will emit neutron-capture gamma rays which are ideal for such calibration purposes. Since the source 11 used for chlorine logging is preferably a source which emits fast neutrons and the detector 13 is a scintillation crystal detector of gamma rays, the calibrator 15 should be filled with oil 16 or paraffin to provide a supply of hydrogen to thermalize the fast neutrons emitted by the source whereby the iron nuclei may capture the slow neutrons and emit gamma rays.

As can be seen from Table A below, the prominent neutron-capture gamma rays of iron not only extend over an energy range which includes the prominent neutron-capture gamma rays of chlorine, but the spectral peaks formed by the prominent neutron-capture gamma rays of iron also occurs at nearly the same energy levels as do the spectral peaks formed by the prominent neutron-capture gamma rays of chlorine.

As is well known in the art, these spectral peaks result from the pair-production effect. When the high energy gamma ray strikes a typical scintillation crystal detector, an electron-positron pair is produced. Upon the annihilation of the positron, there are produced two annihilation quanta each having an energy of substantially one-half mev. Neither of these annihilation quanta may escape from the crystal, or only one of the two may escape, or both may escape. Accordingly, each such neutron-capture gamma ray from a particularly excited nucleus may surrender its total energy to a detector, or its total energy minus substantially one-half mev. or its total energy minus substantially one mev.

*Table A*

| | Gamma ray energy | Predicted energy of detected peaks | | |
|---|---|---|---|---|
| | | No escape | One escape | Two escape |
| Iron | 5.93 | 5.93 | 5.42 | 4.91 |
| | 6.03 | 6.03 | 5.52 | 5.01 |
| | 7.64 | 7.64 | 7.13 | 6.62 |
| Chlorine | 6.12 | 6.12 | 5.61 | 5.10 |
| | 6.62 | 6.62 | 6.11 | 5.60 |
| | 7.41 | 7.41 | 6.90 | 6.39 |

As can be seen from FIG. 2 of the drawings, several of the spectral peaks of the neutron-capture gamma rays of iron can be clearly identified on curve A which illustrates the neutron-capture gamma ray spectrum of iron as obtained experimentally when the logging instrument 10 was inserted within the calibrator 15. It is to be noted that the 4.95 mev. spectral peak is due to both the 5.93 mev. and the 6.03 mev. neutron-capture gamma rays of iron. The 2.23 mev. spectral peak of hydrogen, due to the hydrogen of the oil 16 used in the calibrator, also appears. Curve A' illustrates the new position to which the curve A may shift with respect to the channels of the multichannel analyzer if the borehole instrumentation becomes nonlinear.

Reference is now made to FIG. 2 for an understanding of the manner in which the pulse height analyzer of the logging system may be calibrated. The gain control 19 of the amplifier 18 is adjusted until the 2.23 mev. spectral peak of hydrogen falls on a particular channel of the multichannel analyzer, i.e., channel 17. It can also be seen that the 4.95 and 6.62 spectral peaks of iron fall on channels 47 and 67 respectively. If it has been determined that the energy band of interest is within 4.95 mev. and 6.62 mev., the pulse height analyzer is adjusted, by the adjustment of controls 22 and 23, to pass only the pulses accepted by channels 47–67 of the multichannel analyzer. The electrical signals on output line 24 will thus be proportional to the total integrated count of the gamma rays detected within the energy range of 4.95–6.62 mev. For example, in the case of iron, the output will be proportional to the total integrated count under the curve A of FIG. 2 within the energy range of 4.95–6.62 mev. or within channels 47–67 of the multichannel analyzer.

It is to be noted that the above energy band is only exemplary and the most desirable energy band for obtaining accurate chlorine logs through an iron cased borehole is within the energy range of approximately 4.6–6.3 mev. as fully described in application, Serial No. 79,453, filed December 29, 1960, by Richard L. Caldwell and George N. Salaita.

As therein stated, a difference exists between the total integrated count of the neutron-capture gamma rays emitted from a salt-water-saturated formation in an iron environment and the total integrated count of the neutron-capture gamma rays emitted by an oil-saturated formation in an iron environment. This difference can be converted into a percentage difference and used as a measure of the sensitivity or the ability to distinguish between an oil-saturated formation and a salt-water-saturated formation.

It has been found that this percentage difference varies at different energy ranges. For example, with a count of all gamma rays of energies in excess of 2.3 mev., the percentage difference is approximately 6 percent; at energies in excess of 5 mev., the percentage difference is approximately 7 percent; and at energies in excess of 6.64 mev., the percentage difference is negligible since at energies in excess of 6.64 mev. the neutron-capture gamma ray spectrum of a salt-water saturated formation is an iron environment substantially coincides with the neutron-capture gamma ray spectrum of an oil-saturated formation in an iron environment. The greatest percentage difference is obtained within the energy range of approximately 4.6–6.0 mev., and that percentage difference is 14 percent. Thus, within the energy range of approximately 4.6–6.0 mev., the sensitivity is doubled or is increased by 100 percent over that obtained at energies in excess of 5 mev. Furthermore, it has been found that small deviations from the desired energy range can result in a much lower sensitivity than that obtained within the energy range of approximately 4.6–6.0 mev. For example, within the energy range of 3.9–5.3 mev., the sensitivity is 12 percent, and within the energy range of 5.3–6.7, the sensitivity is only 8.8 percent. In the latter case, the low sensitivity is due to the fact that in excess of 6.4 mev., the neutron-capture gamma ray spectrum of a salt-water-saturated formation in an iron environment substantially coincides with the neutron-capture gamma ray spectrum of an oil-saturated formation in an iron environment, as stated above.

From the foregoing it can be seen that it is important to keep the discriminator responsive to the desired energy range of 4.6–6.0 mev. when logging for chlorine in an iron environment. Nonlinearity of the logging instrumentation can easily cause the discriminator to become responsive to the above exemplary energy ranges of 3.9–5.3 mev. and 5.3–6.7 mev., in which case inaccurate indications of the chlorine content of the formations will be obtained. This is especially true if the discriminator becomes responsive to gamma rays having energies of 6.4 mev. or above. In such cases, the trace 25a recorded by recorder 25 will not be indicative of the true chlorine content within the formation.

During field operations, the logging system is periodically checked with the aid of the iron calibrator, the multichannel analyzer, and the oscilloscope to determine whether the pulse height analyzer is responsive to the gamma ray count within the desired energy range. When the logging system is being calibrated and checked, the amplifier gain is adjusted until the 2.23 mev. spectral peak of hydrogen always falls on the same channel of the multichannel analyzer, i.e., channel 17. If the borehole instrumentation, including the amplifier 18, becomes nonlinear, the scope will visually display the result of any nonlinearity. For example, the electrical pulses coming from amplifier 18 which were originally accepted by channel 67 of the multichannel analyzer may change in magnitude due to the nonlinearity of the borehole instrumentation so that they are now accepted by channel 64. The electrical pulses which were originally accepted by channel 47 of the multichannel analyzer may change in magnitude so that they are now accepted by channel 46. Thus, the spectral peaks of the neutron-capture gamma rays of iron will be shifted with respect to the channel numbers. Accordingly, channel 67 of the multichannel analyzer may now be accepting electrical pulses proportional to 7 mev. instead of 6.62 mev. Channels 47–66 may also be accepting electrical pulses proportional to different energies in mev. Since the pulse height analyzer 21 was adjusted originally for response to the electrical pulses accepted by channels 47–67, the pulse height analyzer 21 will also be responsive to the new energy range unless it is readjusted.

To readjust the pulse height analyzer for response to the energy range of 4.95–6.62 mev., controls 22 and 23 can be adjusted whereby the pulse height analyzer will pass only the pulses accepted by channels 46–64 of the multichannel analyzer.

In another embodiment of the invention, the logging system is calibrated by adjusting the gain control 19 to keep the pulse height analyzer 21 responsive to the desired energy range. For example, it may again be assumed that the energy band of interest is within the energy range of 4.95–6.62 mev., which lies within channels 47–67 of the multichannel analyzer. As before, the pulse height analyzer is adjusted to pass only the electrical pulses accepted by channels 47–67 of the multichannel analyzer. If during logging operations the energy band again shifts so that it lies within channels 46–64, the pulse height analyzer can be kept responsive to the desired energy band by adjusting the gain control 19 to shift the 4.95 and 6.62 mev. spectral peaks back in line with channels 46 and 47 respectively to bring the energy range back within channels 47–67 of the multichannel analyzer. It can thus be seen that the bias controls 22 and 23 of the pulse height analyzer or the gain control 19 of the amplifier 18 can be adjusted for calibrating the system.

It now becomes apparent that a radioactive logging system may be accurately calibrated if the radiation used for calibration has an energy range which includes the energy band of interest and also exhibits prominent spectral peaks at the same or nearly the same energy levels as those exhibited by the secondary radiation of interest. Thus, in calibrating a radioactive logging system for response to the prominent neutron-capture gamma rays of chlorine, other forms of secondary radiation may be used which exhibit the above properties. For example, it is within the scope of this invention to use the neutron-capture gamma rays of chlorine for such calibration. Such gamma rays may be obtained by inserting salt water in a calibrator made of plastic or of other materials which do not emit neutron-capture gamma rays which might interfere with those of chlorine.

In one embodiment of the present invention, the source 11 was a capsuled neutron source of the plutonium-beryllium type. The shield 12 was of tungsten and the detector 13 was a sodium oxide crystal. The photomultiplier instrumentation 14 included a DuMont Photomultiplier, Type 6292. The pulse height analyzer 21 was of the type manufactured by the Hamner Electronics Company, Princeton, New Jersey, Model N-302, and the multichannel analyzer 27 was of the type manufactured by the Pacific Electro-Nuclear Corporation, Culver City, California, Model PA-4.

Having described the invention, it will be understood that modifications may now suggest themselves to those skilled in the art, and it is intended to cover all those as fall within the scope of the appended claims.

What is claimed is:

1. In radioactive well logging wherein the presence of chlorine in subsurface formations adjacent a borehole is detected by irradiating said subsurface formations with a source of neutrons and detecting the resulting neutron-capture gamma rays of chlorine only within the energy band of from about 4.6 to about 6.3 mev. by means of a logging system including a gamma ray detector and an energy discriminator, the method comprising calibrating said logging system by:

positioning said source of neutrons and said gamma ray detector within an environment including a substantial proportion of hydrogen and iron, detecting the resulting hydrogen-capture and iron-capture gamma rays, producing from said detected hydrogen-capture and iron-capture gamma rays pulses having magnitudes proportional to the energies of said gamma rays, converting said pulses into an observable energy spectrum including spectral peaks occuring at energy levels known to be representative of said hydrogen-capture and iron-capture gamma rays, and adjusting said discriminator with said spectral peaks at said known energy levels as a reference, for response by said discriminator to said neutron-capture gamma rays only within said energy band of from about 4.6 to about 6.3 mev.

2. The calibrating method of claim 1 further including shielding said detector so that direct radiation from said source is absorbed prior to arrival at said detector.

References Cited by the Examiner

UNITED STATES PATENTS

| | | | |
|---|---|---|---|
| Re. 24,383 | 10/57 | McKay | 250—83.3 |
| Re. 24,797 | 3/60 | Scherbatskoy | 250—83.3 |
| 2,666,142 | 1/54 | Herzog et al. | 250—83 |
| 2,705,289 | 3/55 | Youmans | 250—83.6 |
| 2,816,235 | 12/57 | Scherbatskoy | 250—83 |
| 2,831,122 | 4/58 | Brucer | 250—83 |
| 2,905,826 | 9/59 | Bonner et al. | 250—83.6 |
| 2,938,119 | 5/60 | McKay | 250—43.5 |
| 2,945,129 | 7/60 | Swift et al. | 250—83 |
| 2,983,817 | 5/61 | Early et al. | 250—83.3 |

OTHER REFERENCES

Caldwell: Nuclear Physics in Petroleum Exploration Research, World Petroleum, April 1956, pp. 59–63.

RALPH G. NILSON, *Primary Examiner.*

ARTHUR GAUSS, ARCHIE R. BORCHELT,
*Examiners.*

UNITED STATES PATENT OFFICE
CERTIFICATE OF CORRECTION

Patent No. 3,213,279                          October 19, 1965

Richard L. Caldwell

It is hereby certified that error appears in the above numbered patent requiring correction and that the said Letters Patent should read as corrected below.

Column 1, line 39, for "Alhtough" read -- Although --; column 2, line 16, for "spetcral" read -- spectral --; line 34, strike out "ment to be encountered within mrtiosnhte fea lelyaehto"; line 39, for "radiaion" read -- radiation --; same column 2, line 51, for "disrtibution" read -- distribution --; column 3, line 69, for "vibrations" read -- variations --; column 4, line 27, for "occurs" read -- occur --; column 5, line 39, for "is" read -- in --.

Signed and sealed this 12th day of July 1966.

(SEAL)
Attest:

ERNEST W. SWIDER
Attesting Officer

EDWARD J. BRENNER
Commissioner of Patents